United States Patent [19]
Bublitz et al.

[11] Patent Number: 5,684,742
[45] Date of Patent: Nov. 4, 1997

[54] DEVICE AND METHOD FOR THE SIMPLIFIED GENERATION OF TOOLS FOR THE INITIALIZATION AND PERSONALIZATION OF AND COMMUNICATION WITH A CHIP CARD

[75] Inventors: Hermann Bublitz, Boeblingen; Klaus Rindtorff, Weil im Schoenbuch, both of Germany

[73] Assignee: International Business Machines Corporation, Armonk, N.Y.

[21] Appl. No.: 662,863

[22] Filed: Jun. 12, 1996

[30] Foreign Application Priority Data

Sep. 20, 1995 [DE] Germany .................. 195 36 548.8

[51] Int. Cl.$^6$ ............................................. G11C 7/00
[52] U.S. Cl. ................ 365/189.01; 365/218; 235/492
[58] Field of Search .................. 365/189.01, 218; 235/492

[56] References Cited

U.S. PATENT DOCUMENTS

| 4,648,076 | 3/1987 | Schrenk | 365/189.01 |
| 5,511,023 | 4/1996 | Schrenk | 365/189.01 |

*Primary Examiner*—Harold Pitts
*Attorney, Agent, or Firm*—Douglas W. Cameron

[57] ABSTRACT

A translator (300) for generating a tool (315) for a modifying data on a chip card (10) or for a communicating with the chip card (10) is proposed, the translator (300) receiving as input data a description (310) in a card definition language provided for that purpose, said description (310) comprising information about objects on the chip card (10) which are described with the use of constructional instructions. The translator (300) comprises a means for generating an internal list of attributes (320) from the information about the objects in the description (310), there existing for each object at least one entry (330) in the internal list of attributes (320). The translator (300) furthermore comprises at least one structure information means (335) describing how the data stored in the at least one entry (330) in the internal list of attributes (320) is transformed into the format determined for the chip card (10), which information from the at least one entry (330) is used and in which format it is stored in the special structure.

18 Claims, 5 Drawing Sheets

START ADDRESS

DEVICE AND METHOD FOR THE SIMPLIFIED GENERATION OF TOOLS FOR THE INITIALIZATION AND PERSONALIZATION OF AND COMMUNICATION WITH A CHIP CARD

TECHNICAL FIELD

The invention concerns the generation of tools for the initialization and personalization of and communication with a chip card.

DESCRIPTION OF THE PRIOR ART

The terms data carrier cards or chip cards are currently used to denote portable cards which are mostly in a check-card type format and preferably made from plastics or metal with an integral electronic chip. A distinction is made between simple memory cards (known as memory chip cards or memory cards) and intelligent data carrier cards (also called multifunctional chip cards or smart cards) which, in addition to a memory area, have their own processor for controlling the data stored on the chip of the data carrier card. This provides for better protection of the data and results in an improved functionality of the chip cards. Simple memory cards generally permit only writing and reading of the data. Intelligent data carrier cards additionally have functions for structuring, localizing, managing and protecting the data. The interface of an intelligent chip card and also, consequently, the programming (e.g. of command sequences) necessary to read data from a chip card, is therefore much more complex than that of memory cards.

Figure 1:
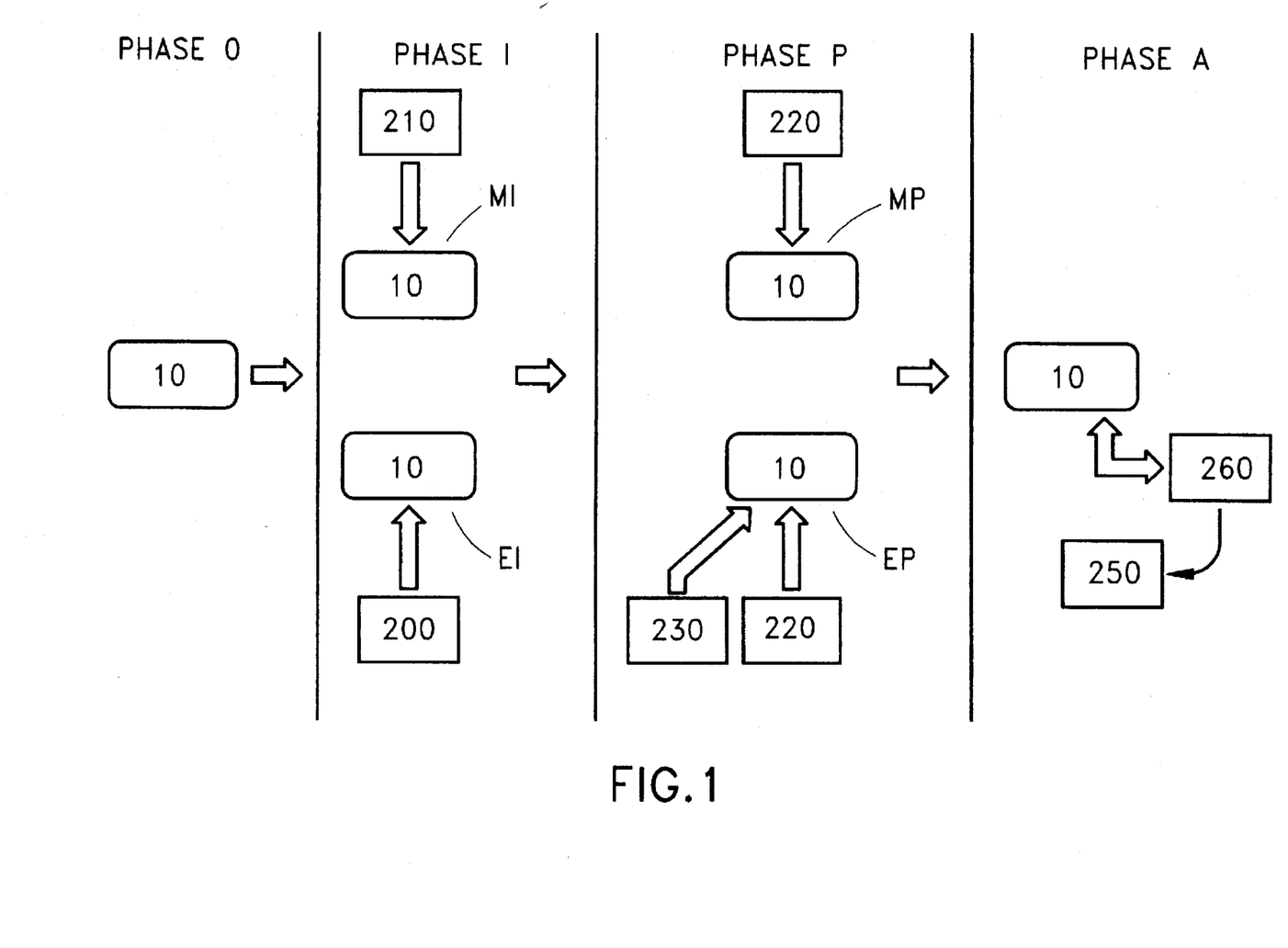
FIG. 1 shows the different phases of a chip card, from the production process, through the initialization and personalization to the application.

FIG. 1 shows the different phases of a chip card 10. A first phase 0 represents the process of production of the chip card 10. At the end of the production process the chip card 10 is in a condition in which it is not yet ready for use. Apart from a fixed operating system that is written into the card, the chip card 10 generally does not contain any data and the writable memories are in an empty state.

In order to bring the chip card 10 into a usable state, it is initialized in a phase 1, i.e., the logical card structure (see FIG. 2) of the chip card 10 is defined by an initialization process on the chip card 10. A file system is created in the memory of the chip card and additional data for the operating system is stored, such as e.g. communication parameters and security-related parameters (such as keywords or passwords).

Figure 2:
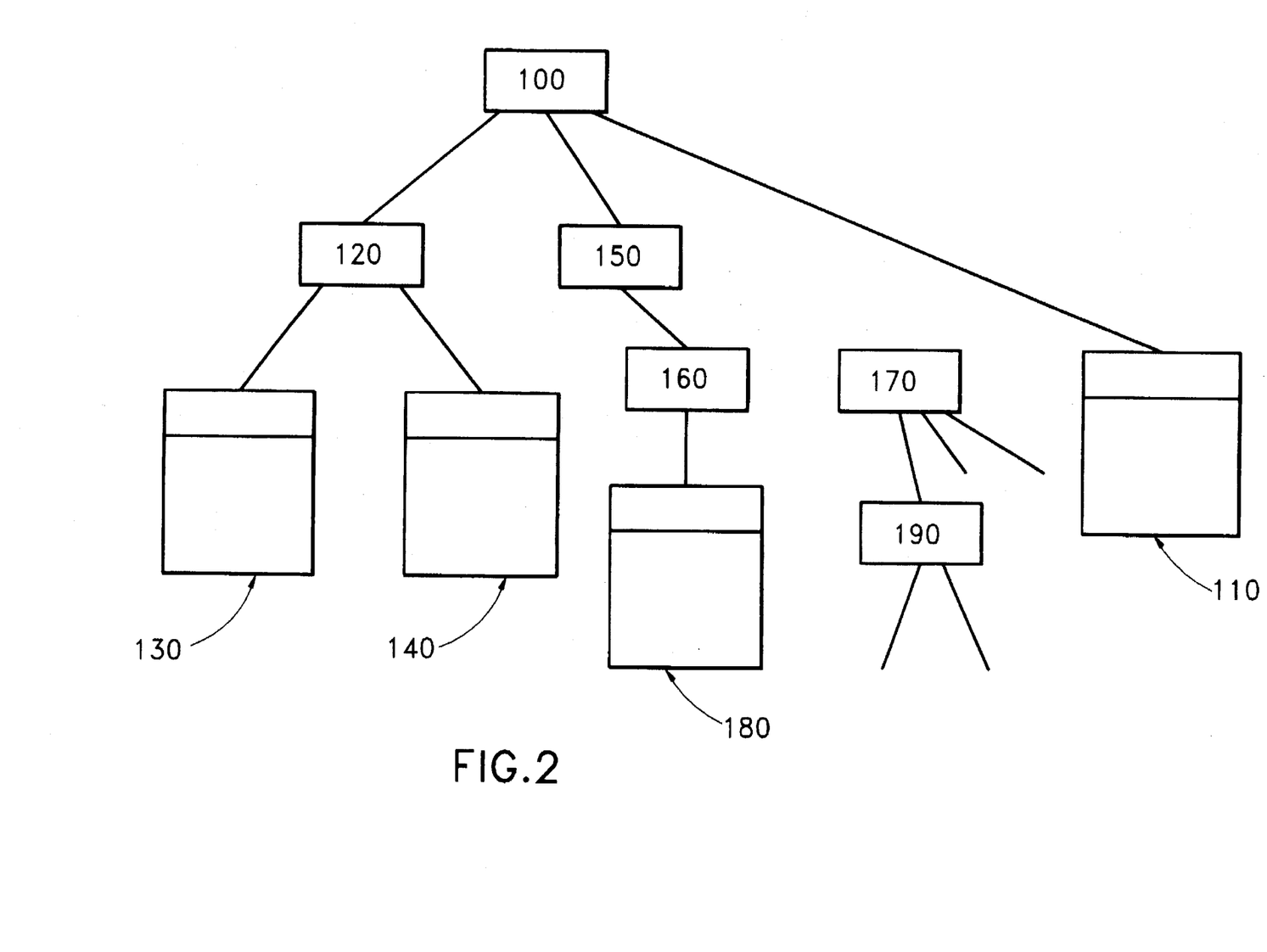
FIG. 2 shows the typical configuration of a logical structure in a chip card.

FIG. 2 shows the typical configuration of a logical structure in a chip card 10. The structure of a system describes its static characteristics, i.e., which components are interconnected, and in what way. The logical structure is thus effected according to considerations of content and preferably forms a tree structure. The structure elements of the logical structure are also called logical objects. The root of the logical structure tree is a root directory 100. A multiplicity of composite logical objects or a multiplicity of elementary logical objects can be attached to the root directory 100. An example of an elementary logical object in FIG. 2 is a file 110, which is directly linked to the root directory 100 and has no further references. FIG. 2 also shows a number of composite logical objects, such as a sub-directory 120 which is linked to 2 files, 130 and 140, and a further sub-directory 150 which, in turn, is linked to 2 further sub-directories 160 and 170, the sub-directory 160 containing a file 180 and the sub-directory 170 having a further sub-directory 190, etc.

Each directory or sub-directory represents a mapping of names to the objects assigned to the particular directory. Each object of the logical structure, i.e., each individual element of the elements 100 to 190 as depicted in FIG. 2, has a number of attributes such as, e.g., an identification name, password protection, access method, etc.

The logical card structure must be predefined in relation to the subsequent use of the chip card 10, e.g. through an applications programmer. The logical file structure and the chaining of the various files must be specified. Various attributes can be assigned to each of the files, such as password protection, read-only or write-only access, read and write access, etc., these being specified in a file description. Ordering arguments are generally allocated for the purpose of accessing the data records of a file. These provide for addressing of each individual record of the file. In the definition of the logical card structure of a chip card 10, it must be taken into account that the semantics of the identification names and attributes is partially defined by standards or by the individual card suppliers.

The initialization process performed is the same for all chip cards 10 of one type and for one subsequent method of use of the chip card 10. In the initialization of the chip card 10 in phase 1, a distinction is made between a mass initialization MI and an individual initialization II (FIG. I). The mass initialization MI is generally effected on a large industrial scale with machines specially set up for that purpose. The individual initialization II, on the other hand, is only performed with smaller numbers of cards and is used primarily to produce laboratory specimens or samples, and to produce smaller individual series. By contrast with the mass initialization, individual initialization is generally performed with non-specialized equipment which has to be specially set up for this individual initialization.

The process of individual initialization II of the chip card 10 is generally performed in that a binary initialization pattern 200 of a memory of the chip card 10 that is to be written to (e.g. an EEPROM or an optical memory) is compiled by a chip card programmer familiar with the internal details of the chip card 10 of a given chip card type. The binary initialization pattern 200 represents the image of the memory that is to be written to, after its initialization, or, in other words, the binary initialization pattern 200 contains the information about the way in which the writable memory is to be written to. The binary initialization pattern 200 is 'copied' into the memory that is to be written to, by means of a program to be compiled for this purpose. This program generates the instructions necessary for the 'copying process'.

The process of mass initialization MI of the chip card 10 is performed in an analogous manner, generally with the use of an initialization table 210. The initialization table 210 contains the complete set of initialization rules, with the commands and binary data necessary for initialization. The machine performing the mass initialization does not need to know the particular type of chip card, but can initialize the chip card 10 directly by means of the initialization table 210. This is particularly advantageous in the initialization of large volumes, and possibly also of different types of chip cards. The initialization table 210 is generally generated by conversion of the binary initialization pattern 200.

The chip card 10 obtained at the end of the initialization process is ready for operation, with a defined logical card and file structure. All chip cards 10 of one chip card type initialized thus by the same initialization method are identical.

In order to individualize the chip card 10 and to provide it with data relating to the card holder, for example, the chip cards 10 are personalized in a further phase P. Each separate chip card 10 is generally personalized individually. The personalization process provides the chip card 10 with personal data relating to the card holder. A distinction is made here between mass personalization MP and individual personalization IP. In the case of mass personalization MP, the personalization process is primarily performed centrally, using data stored in databases, e.g. a customer file or suchlike. Individual personalization IP, on the other hand, is generally performed through data relating to the card holder being entered specially and in a decentralized manner to separate cards, in an individual process.

Both the mass personalization MP and the individual personalization IP of the chip card (10) are generally performed using a personalization table 220. The personalization table 220 contains the instructions necessary for personalization of the chip card 10 and references to data in personalization files (e.g. in a customer file, membership files, etc.). The personalization table 220 is interpreted by a program which inserts the individual data. The instructions are sent directly to the chip card 10 and converted by it. The personalization table 220 is obtained by conversion of a binary map (e.g. a binary personalization pattern 230) and the references. Similarly to individual initialization II, individual personalization IP can also be performed directly using the personalization pattern 230.

At the end of the personalization phase P, the chip card 10 has been converted into a state in which it is ready for use and should, as far as possible, have stored the data necessary for the planned applications of the chip card 10. Start values can be allocated to the individual data records of the files even during the initialization and/or personalization phase.

The successfully initialized and personalized chip card 10 can then be issued to the card holder and used by the latter in an application phase A for the applications intended for the chip card 10.

It is to be understood that the initialization and personalization processes are generally irreversible processes, i.e., the chip card is erased completely before initialization for security reasons. In addition, the chip card 10 can be changed following personalization in such a way that further personalization is no longer permissible. However, conditions can nevertheless also be defined which permit re-personalization or partial personalization. In the case of decentralized personalization in particular, such as individual personalization, even individual areas of the chip card 10 can be re-initialized or personalized, for example, from the application phase. Equally it is possible to apply and personalize new data structures.

Applications with chip cards 10 may include, for example, cashless payment, identification of the chip card holder, storage of data or suchlike. An application consists of internal application parts on the chip card 10 and external application parts in appropriate devices, such as e.g. automatic cash dispensers, PCs or special terminals. In general, internal application parts are all data and programs stored on the chip card 10 itself, while external application parts are all data and programs outside the chip card 10.

A communication with the chip card 10 in the application phase A generally occurs through the use of programming interfaces. Such a programming interface is known to the applicant from the German Patent Application having the file number P 19522527.9 AGE995014U. The theory of this application in respect of the interface to the chip card and the communication with the chip card, and their implementation, is the subject of this present invention.

According to the Patent Application P 19522527.9, a division is made between application-specific data and card-specific data. Application data is data which contains information about the nature, locality, range and access methods relating to data stored on a chip card, as well as the actual data stored on a card. Card-specific data, on the other hand, is data which gives information about the commands and protocol of the chip card necessary for accessing the data stored on it. This division between application-specific data and card-specific data enables one and the same application to be effected using different types of chip card. This results in a substantial simplification of the interface to chip cards and also improves the division between internal application parts on the chip card and external application parts which are separate from the chip card. Flexibility in adaptation to new applications and chip card types is thus enhanced.

Additionally, in FIG. I, an application data directory according to the above-mentioned Patent Application P 19522527.9, the so-called dictionary 250 (application dictionary) for holding application-specific data, is used, for example, for a communication with the chip card 10 in the application phase A. A chip card dialogue module 260, the so-called agent 260 (smart card agent or smart card interpreter) generates the necessary commands for the interface of the chip card 10. The dictionary 250 contains information about the nature, locality, range and access methods of data stored on the chip card 10 and information for any processing of this data that may be necessary because of the security requirements of the application. An alias name, or names, is assigned to the data for simple identification of the particular data for an access by the application. This information is created in the dictionary 250 in an appropriate form, e.g. in a tabular or hierarchical form, and includes all the information necessary for the application or a multiplicity of other applications. Access to the dictionary 250 is effected through the agent 260. The allocation of an appropriate dictionary 250 to an agent 260 appropriate to an application is achieved through the external application part or a special extension of the agent 260.

Detailed knowledge of the internal structures and sequences, and of the card-specific commands and standardizations are required in order to enable the processes of initialization and personalization of the chip card 10 to be performed, and also for a subsequent communication of an application with the chip card 10. Detailed knowledge of the applications and their implementation and of the communication with the chip card 10 is also necessary. However, since it is frequently the case that the groups of persons dealing with the applications are not the same groups of persons dealing with the chip card 10, a high degree of specialization is necessary, which must include detailed knowledge both of the chip card 10 and its particular applications, and also of the initialization and personalization processes.

The object of the invention, therefore, is to facilitate the provision of operational chip cards and the conversion of applications with chip cards. The object of the invention is achieved according to the independent claims. Further advantageous embodiments of the invention are given by the sub-claims.

The invention concerns a translator for generating a tool for a modification of data on a chip card or for a communication with the chip card, the translator receiving as input data a description in a card definition language provided for that purpose and the description comprising information about objects on the chip card which are described with the use of constructional instructions. The translator comprises a means for generating an internal list of attributes from the information about the objects in the description, there existing for each object at least one entry in the internal list of attributes. Furthermore, the translator includes at least one structure information means describing how the data stored in the at least one entry in the internal list of attributes is transformed into the format determined for the chip card, which information from the at least one entry is used and in which format it is stored in the special structure.

According to the invention, a process is performed consisting of: input of the description of the chip card, generation of the internal list of attributes from the information about the objects in the description, input and/or retrieval of the at least one structure information means, and generation of the tool from the description using the internal list of attributes and the at least one structure information means.

BRIEF DESCRIPTION OF THE DRAWINGS

For the purpose of explaining the invention in greater detail, embodiment examples are described below with reference to the drawings.

FIG. 6 shows the sequence of processing of the maps for the chip card memory that is to be written to.

DESCRIPTION OF THE PREFERRED EMBODIMENT

Figure 3:
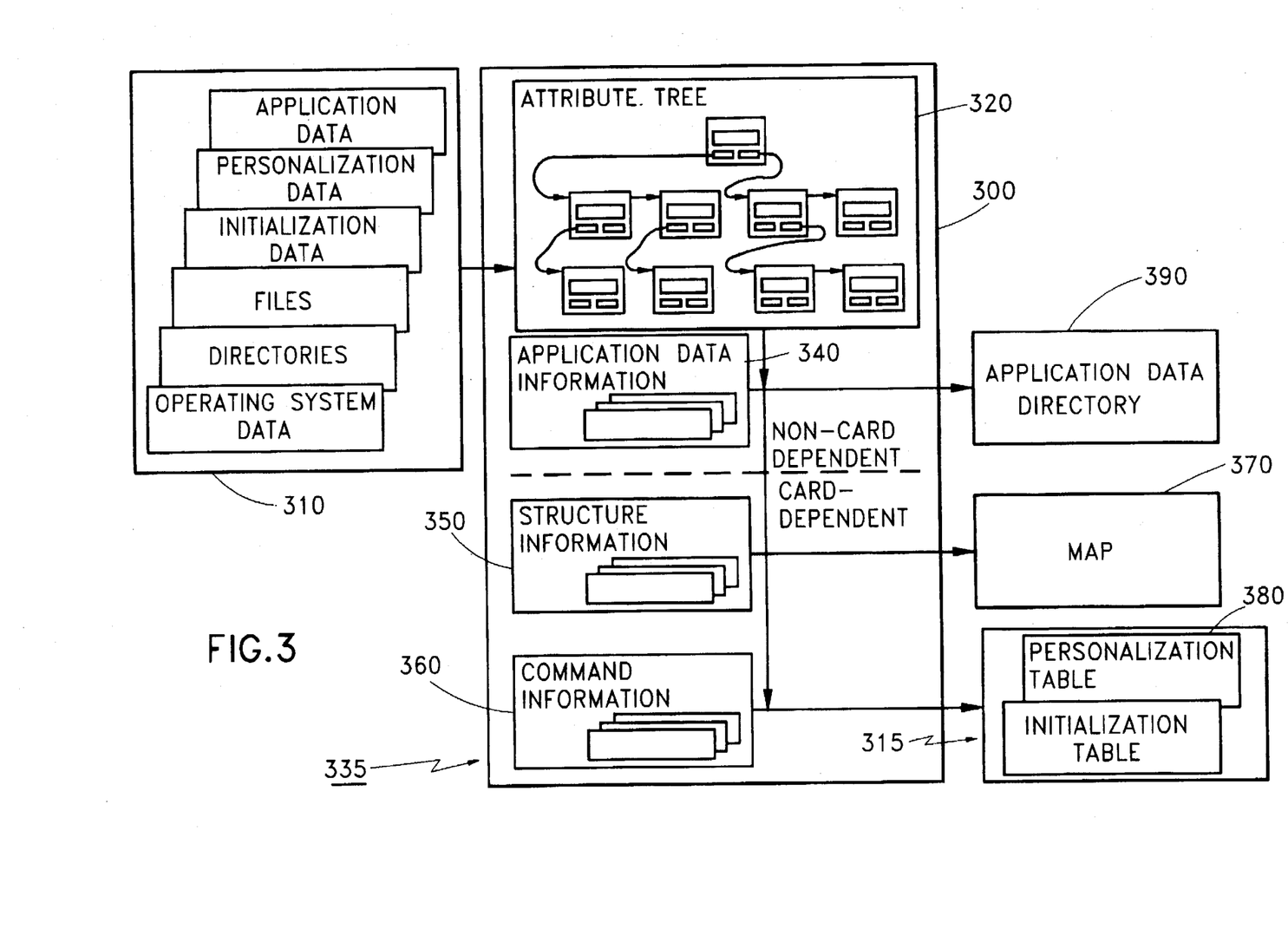
FIG. 3 shows the configuration of a translator according to the invention for the simplified generation of tools in the different phases of a chip card.

FIG. 3 shows the configuration of a translator 300 according to the invention for the simplified generation of tools for, optionally, the initialization and/or personalization of the chip card 10 and/or for the communication with the operationally ready chip card 10. The translator 300 receives as input (source) a description 310 of the chip card 10 in a card definition language provided for this purpose. The description 310 comprises information about objects on the chip card 10 which are described with the use of constructional instructions. The description 310 preferably contains information about:

operating system data directories files initialization data personalization data of the chip card 10, as well as application data for a communication with the chip card 10.

The description 310 comprises attribute instructions which specify the characteristics of the objects (this explained more fully under card definition language).

The data that is accessible on the chip card 10 preferably is allocated alias names, provided for that purpose, in the description 310. The description 310, for that purpose, is provided in human-readable form and in the syntax of a special description language, the card definition language, for the translator 300. From the description 310 the translator 300 generates the data and commands that are necessary, according to the requirement, for an appropriate application such as initialization, personalization or communication with the chip card 10.

From the description 310 the translator 300 generates special structures 315 for a conversion of data (e.g. in the case of initialization or personalization) on the chip card 10 and for the communication with the chip card 10. The special structures 315 provide for a conversion of the required structure corresponding to the description 310 into a physical structure on the chip card 10. This conversion can be effected either through the direct provision of an appropriate tool or through the indirect generation of aids for the generation of the appropriate tool.

Figure 5:
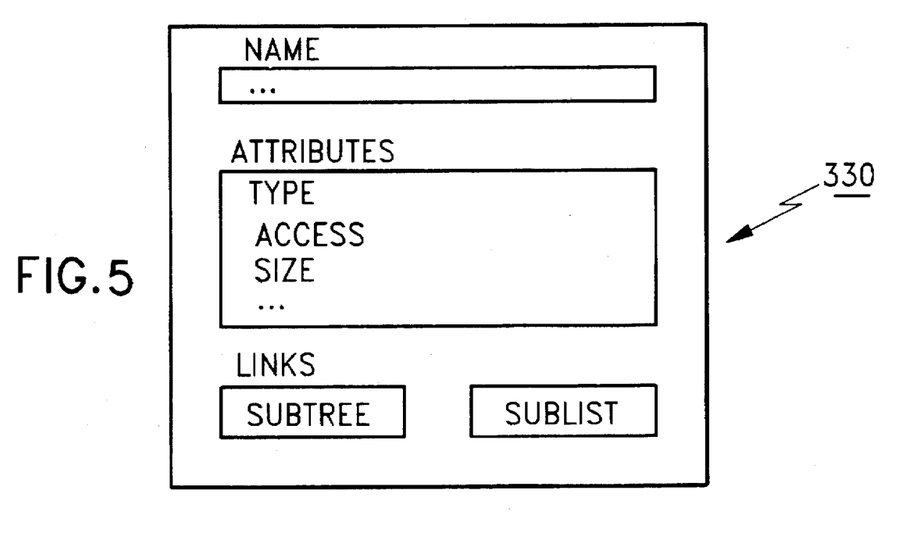
FIG. 5 shows a node in the attribute tree.

From the information about the objects in the description 310 the translator 300 generates an internal tree structure 320 (see also FIG. 4), the so-called attribute tree 320. For each object, defined by a constructional instruction, there exists a node 330 in the tree of the internal tree structure 320. Each node 330 (FIG. 5) contains:

a name of the object a type of the object attributes of the object, as specified in the attribute instructions links with other nodes in the attribute tree 320.

Figure 4:
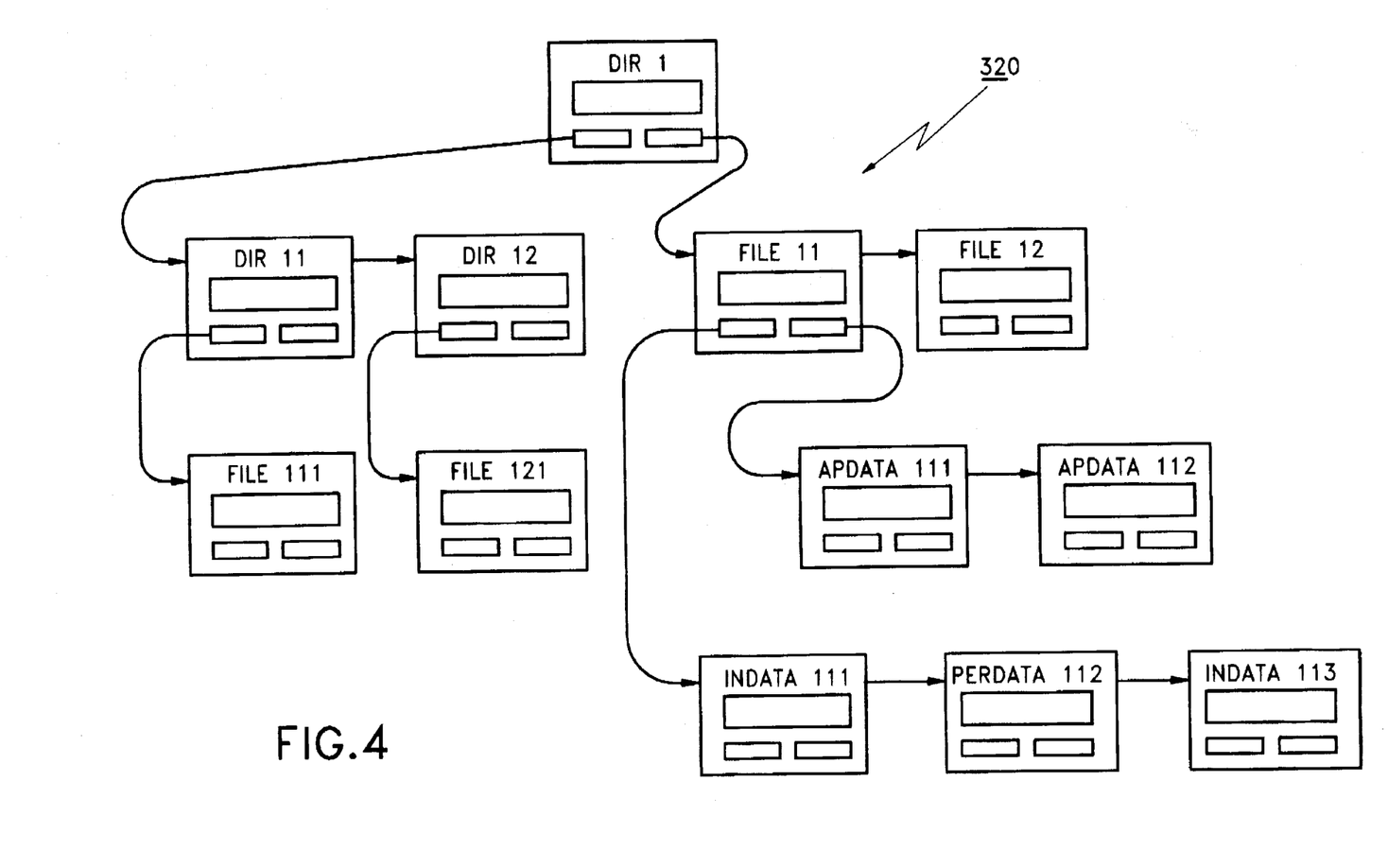
FIG. 4 shows an attribute tree.

The attribute tree 320 is non-dependent on the particular type of chip card used. It is to be understood that the attribute tree 320 is generally a list of attributes which is characterized as a sequential, hierarchical list and preferably forms a tree structure.

The translator 300 receives general structure information means 335 (so-called templates), such as application data information 340, structure information 350 and command information 360. From these, the translator 300 generates, for example, either a map 370 of the memory of the chip card 10 that is to be written to, a table 380 or an application data directory 390.

The structure information 350 and command information 360 describe how the data stored in the nodes of the attribute tree 320 are to be transformed into a format determined for the chip card. They determine which information from the nodes is to be used and in which format it is to be stored in the special structures 315. In order to generate the special structures 315 for any given chip card, therefore, it is sufficient to adapt the general structure information means 335 to the characteristics of the card.

The map 370 of the memory of the chip card 10 that is to be written to (preferably an EEPROM) is preferably the binary pattern 200 for the individual initialization II or the personalization pattern 230.

The table 380 can, for example, be the initialization table 210 for the mass initialization MI or the personalization table 220 for the mass personalization MP of the chip card 10.

The application data directory 390 contains application-specific data that is necessary for a communication with the chip card. The application data directory 390 is preferably the dictionary 250 (see in FIG. 1), which contains the application-specific data for a communication with the chip card 10, e.g. through the agent 260 according to the above-mentioned Patent Application P 19522527.9.

It is to be understood that the translator 300 can provide tools other than those mentioned for the preparation and provision of the chip card 10 and for the communication with the chip card 10. These tools are then defined by the required application of the chip card 10.

The application data information 340 preferably has a general layout of the application data directory 390.

The structure information 350 preferably contains information about the directory as a general layout of the internal physical structure on the chip card 10 (for example: the internal data record is 16 bytes long, byte I is always 0×63, byte 2 specifies the length of the data, etc.);

the files as a general layout of the internal physical structure on the chip card 10; and the operating system data as a general layout of the internal operating system structure;

in the appropriate format ('bits and bytes') of the chip card 10.

The command information 360 preferably contains information about the initialization table 210 and the personalization table 220 as a general layout of the particular table and of the corresponding necessary commands.

The structure information 340 for the application data directory 390 is not dependent on the type of the chip card 10. The initialization table 210, the personalization table 220 and the map 370 are dependent on the type of the chip card 10, i.e., each structure information means (350 or 360) exists once for each chip card type.

The application data directory 390 and the map 370 of the memory of the chip card 10 that is to be written to are preferably compiled first from the attribute tree 320 and the structure information means 335.

Application data directory 390

A binary and a readable (e.g. in C source code) application data directory 390 are preferably generated as a dictionary 250, for example. For each 'application data' type node, one entry is generated in the dictionary 250, both in binary and in readable form. The structure of the entry is predefined by the internal structure information 350. The content of the entry is copied from the attribute tree 320: the name of the entry, the access type (e.g.: 'read first', 'read last', ...), the length and the position is copied from the 'application data' type node and the path and the file type are copied from the file node above it. The 'application data' type nodes can be processed in any order. At the end of this process, there is a complete application data directory 390 in binary form and one such in readable form, according to the Patent Application P 19522527.9. Patent Application P 19522527.9 contains a detailed description of the application data directory 390.

Figure 6:
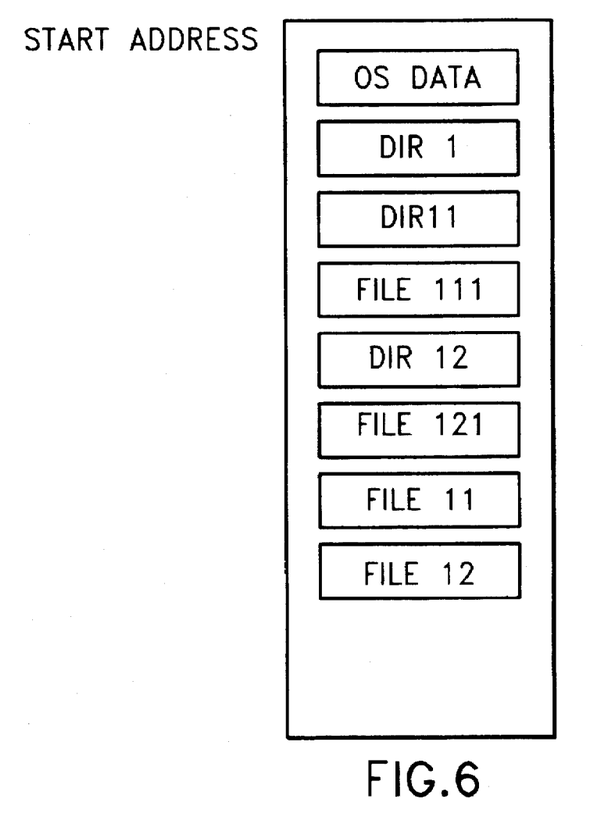

Map 370 (image, memory or EEPROM map):

The operating system data is preferably written first to positions defined by the internal structure information 350. The attribute tree 320 is then processed in a predefined sequence. From the 'directory' type node, a chip card specific binary map of the directory is generated for the memory of the chip card 10 (e.g. the EEPROM) that is to be written to. From a 'file' type node and the 'initialization data' and 'personalization data' type nodes below it, a chip card specific binary map of the file is generated for the memory of the chip card 10 that is to be written to. The separate maps are stored in the map 370 for the memory of the chip card 10 that is to be written to, in the sequence of processing (FIG. 6). Processing preferably commences with the uppermost directory in the tree. The sub-directories of the directory are then processed, followed by the files under the directory. A sub-directory is processed in the same way as the first directory, i.e., the processing is recursive.

The processing of a directory generates from the attributes of the directory node and the internal structure information 350 for directories (as described above for the application data directory 390) a binary map of the directory, in the memory that is to be written to. The processing of a file generates from the attributes of the file and the initialization and personalization data nodes below it and the internal structure information 350 for files (as described above for the application data directory 390) a binary map of the file, including the file data, in the memory that is to be written to. In the generation of the file data, additional attributes are entered in the appropriate nodes, referring to the generated data in the binary map 370 of the memory that is to be written to.

Initialization table 210

The initialization table 210 is generated from the map 370 for the memory of the chip card 10 (e.g. the EEPROM map) that is to be written to. The internal general command information 360 of the initialization table 380 contains the chip card commands and the (maximum) data lengths. A command sequence is generated with data from the map 370 for each maximum data length. Command sequences for security checking are preferably inserted at the start of the initialization table 210, with command sequences for writing the protocol and the status change inserted at the end.

Personalization table 220

The personalization table 220 is generated from the attribute tree 320 and the internal general command information 360 of the personalization table 220. A command sequence is generated for each personalization data node. The additional attributes generated in the generation of the file are used to calculate the addresses in the memory of the chip card 10 that is to be written to. Command sequences for security checking are preferably inserted at the start of the personalization table 220, with command sequences for writing the protocol and the status change being inserted at the end.

Card definition language

The conversion of the description 310 into the particular special internal structure 315, such as the initialization information 350, the personalization information 360 and the application information 340, is effected using the special card definition language. The card definition language is an application based declarative language and is applied by the description 310. The term declarative language denotes a language which explicitly defines through language constructs the data types and structures on which a program operates. A declarative language is thus an arrangement with respect to the data structures.

The card definition language defines the elements of the chip card 10, such as the directories, the files with the corresponding initialization data, personalization data and application data, as well as the data required for the operating system of the chip card 10. Instructions, names, values, symbolic values, expressions and comments can be used as language elements.

Instructions are either constructive instructions, which define the elements of the chip card 10, or attribute instructions, which describe the characteristics of the elements. Attribute instructions define characteristics of elements and are contained in constructive instructions, and are optional. Within a constructional instruction, attribute instructions can be specified in any order. The same characteristics can be specified several times. The last instruction is valid. Instructions are preferably defined as: INSTRUCTION or INSTRUCTION(element1, element2, ...), where element1, element2 ... can stand for instructions, names, values, symbolic values or expressions.

Names are used in constructive instructions to identify the generated elements of the chip card 10. Names are optional, and if no name is specified, an internal name is generated.

Values are character strings to which an arithmetical value can be allocated by evaluation. Character strings can have lengths from 0 up to the maximum size of the memory that is to be written to, e.g. an EEPROM.

Symbolic values are symbols which represent a value. The symbolic values are defined in a declaration instruction, e.g.:

```
Declaration
(
 Symbol1 (expression)
 Symbol2 (expression)
 ...
).
```

Symbolic values can also be assigned within an expression, for example with an assignment by the operator '=' Symbolic values can be used in subsequent declarations. In the above example, symbol1 could be used in the expression for symbol2. Symbols can be declared more than once. Subsequent declarations overwrite preceding declarations.

Values can be represented by, for example, arithmetical expressions, Boolean expressions, character string expressions, symbolic expressions and assignment expressions. Signs such as '+' and '−' can be used in a specific, predefinable means of representation, for example in brackets, e.g. (−122).

Expressions are preferably processed from left to right. An operator priority can be controlled by brackets, for example. Instructions and expressions can extend over several lines. Text character strings must be contained in one line. Longer character strings can be generated with an appending operator, e.g. ','.

Comments can be inserted to improve readability and comprehensibility.

Layout definition

The structure description 310 (also called layout definition) of a chip card 10 preferably consists of four sections, the prologue, the operating system data of the chip card 10, the directory file tree and the protocol data.

The prologue is optional and consists of declaration and/or environment instructions. A declaration instruction defines symbolic values. These symbolic values can be used subsequently in expressions. An environment instruction specifies the type of the chip card 10 and parameters for the personalization information 360 and the initialization information 350.

The following example of a prologue defines, amongst others, the size of the available memory, its start address, and the operating system type of the chip card 10.

```
Environment      /* Start of prologue declarations   */
(
 Eeprom_size (8128)    /* Memory size                */
```

```
 Start_address (0x0100)          /* Start address      */
 ROM_Mask Id ("MFC Version 2.0") /* Operating system   */
)
```

The operating system data defines initial values for areas of the memory of the chip card 10 that is to be written to, these areas being provided for the expansion or modification of the operating system of the chip card 10. They consist of declaration instructions for these initial values. Example:

```
Declarations(
 Jump ( 0xCC)        /* Jump instruction                      */
 AltReset ( 0x0000)  /* Alternate reset address               */
 EndProcess ( 0x7FF0)/* End process address                   */
 ATR_table(          /* Table with data for the ATR           */
     0x3B,     /* direct convention                     */
     0x86,     /* T0 : 6 historical chars               */
     0x81,     /* TD1 : TD2 Follows                     */
     0x31,     /* TD2: TA3, TB3 follows                 */
     0x40,     /* TA3 : T = 1 ICC Info field size       */
     0x34,     /* TB3 : T = 1 Block/char waiting time   */
     "IBMMFC", /* Historical characters                 */
     0x05 /* CRC */
  )
...)
Fixed_data (
 0,0,0,0,  /* 4 byte reserved memory                    */
 Jump, EndProcess, /* jump table for changes            */
 Jump, AltReset,   /* jump table for changes            */
 Sizeof (ATR_table) /* length of ATR table              */
 ATR_table   /* ATR TABLE is inserted here              */)
```

The attribute tree 320 is defined with a directory/file instruction. Symbolic names are assigned to the directories and files. A directory/file characteristic instruction defines the characteristic of the directory, the access characteristics and the security areas, e.g. for the generation of the application data directory 390. They can be defined in any order and several times.

Initialization data and personalization data instructions define the initialization and personalization data for a file. The initialization data instruction defines data in the file which is written at the time of initialization.

The personalization data instruction defines fields in the file which are subsequently personalized individually for each chip card 10. It defines the length of a personalization data field, a symbolic index, which correlates the data field with the personalization data record, and an optional security method.

An application data instruction defines data fields for the application programs. The data fields generate entries, e.g. in the application data directory 390.

Access characteristics are defined with an access instruction. The access characteristics define security-related characteristics and the access methods that can be used for the data.

The following example shows the description of a directory structure, such as that in FIG. 2, for example, in a card definition language:

```
Directory    /* Declaration of a directory      */
( DIR_100    /* Symbolic name of the directory  */
...
Directory    /* Declaration of a directory      */
( DIR_120    /* Name of the sub-directory       */
...
```

-continued

```
File    /* Declaration of a file                     */
( FILE130 /* Symbolic name of the file              */
  ...
  Access /* Definition of the access                */
          characteristics
  ( Read ( ALWAYS )
    Update ( PROTECTED )
  )
  /* Data for the application data directory        */
  Agent_data ( CARD_SEQUENCE_NUMBER length(10))
  /* Data for the initialization table              */
  Initial_data ( 999999999 )
  /* Data for the personalization table             */
  Personal_data ( ItemNo123 )
  ...
)
File    /* Declaration of a file                     */
( FILE140 /* Symbolic name of the file              */
  ...
  /* Data for the application data directory        */
  Agent_Data ( CARD_COUNTRY_CODE   length( 2))
  /* Data for the initialization table              */
  Initial data ( "DE" )
  ... /* Further data */
)
)
Directory /* Declaration of a directory             */
DIR_150)    /* Name of the sub-directory            */
  ...
)
)
```

In the above example, the directories 100, 120 and 150 are created. The directory 120 is a sub-directory of directory 100 and itself contains, in turn, the files 130 and 140. A card sequence number with 10 digits was stored in file 130. The initial value is 999999999 and is replaced in personalization as 'ItemNo123' by the current value. The access characteristics of the file permit an unrestricted read access but a write access is permitted only after appropriate security checking. The file 140 contains a country code, of 2 digits in length, and is prefixed with the text "DE".

The type of the chip card 10 is preferably defined with specification of the processor type of the chip card, the size of the writable memory, e.g. an EEPROM, together with its start address, and the operating system type of the chip card.

Having thus described our invention, what we claim as new and desire to secure by Letters Patents is:

1. An apparatus (300) for generating a tool (315) for modification of data on a chip card (10) or for communication with the chip card (10), the apparatus (300) receiving as input data a description (310) in a card definition language provided for that purpose and the description (310) comprising information about objects on the chip card (10) which are described with the use of constructive instructions, the apparatus comprising:

means for generating an internal list of attributes (320) from the information about the objects in the description (310), there existing for each object at least one entry (330) in the internal list of attributes (320), and at least one structure information means (335) describing how the data stored in the at least one entry (330) in the internal list of attributes (320) is transformed into the format determined for the chip card (10), which information from the at least one entry (330) is used and in which for format it is stored in the special structure.

2. An apparatus as recited in claim 1 wherein the tool (315) is an application data directory (390), the application data directory (390) comprising application-specific data necessary for a communication with the chip card.

3. An apparatus as recited in claim 2, wherein the application data directory (390) is a dictionary (250).

4. An apparatus as recited in claim 1 wherein the tool (315) is a means for an initialization and/or personalization of the chip card (10).

5. An apparatus as recited in claim 1, wherein the modification of data on the chip card (10) is a provision of the chip card (10) through initialization and/or personalization of the chip card (10).

6. An apparatus as recited in claim 5, wherein the tool (335) is a map (370) of a memory of the chip card (10) that is to be written to or a table (380) for the initialization and/or personalization of the chip card (10).

7. An apparatus as recited in claim 1, wherein the description (310) comprises information about operating system data, directories, files, initialization data and personalization data of the chip card (10) and/or application data for a communication with the chip card (10).

8. An apparatus as recited in claim 1, wherein the description (310) comprises attribute instructions which specify the characteristics of the objects.

9. An apparatus as recited in claim 1, wherein the data that is accessible on the chip card (10) is allocated alias names, provided for that purpose, in the description (310).

10. An apparatus as recited in claim 1, wherein the description (310) is available in a human-readable form.

11. An apparatus as recited in claim 1, wherein at least one entry (330) comprises a name of the object, a type of the object, attributes of the object and links with other entries in the list of attributes (320).

12. An apparatus as recited in claim 1, wherein the list of attributes (320) is not dependent on the use of any particular type of chip card (10).

13. An apparatus as recited in claim 1, wherein the structure information means (335) comprises application data information (340), structure information (350) and/or command information (360).

14. An apparatus as recited in claim 13, wherein the application data information (340) comprises a general layout of the tool (315).

15. An apparatus as recited in claim 13, wherein the structure information (350) comprises information about a directory as a general layout of the internal physical structure on the chip card (10), about files as a general layout of the internal physical structure on the chip card (10), and about operating system data as a general layout of the internal operating system structure, in the appropriate format of the chip card (10).

16. An apparatus as recited in claim 1, wherein the command information (360) comprises information about the initialization table (210) and the personalization table (220) as a general layout of each of the tables and the corresponding necessary commands.

17. An apparatus as recited in claim 1, wherein the list of attributes (320) is a sequential, hierarchical list, preferably forming a tree structure.

18. A method for generating a tool (315) for modification of data on a chip card (10) or for communication with the chip card (10), said method comprising:

inputting a description (310) of the chip card (10), in a card definition language provided for that purpose, the description (310) containing information about objects on the chip card (10) which are described with the use of constructive instructions;

generating an internal list of attributes (320) from the information about the objects in the description (310), there existing for each object at least one entry (330) in the internal list of attributes (320); and inputting and/or retrieving at least one structure information means (335) describing how the data stored in the at least one entry (330) in the internal list of attributes (320) is to be transformed into the format determined for the chip card (10), which information from the at least one entry (330) is used and in which format it is stored in the tool (315), wherein the tool is generated from the description (310) with the use of the internal list of attributes (320) and the at least one structure information means (335).

* * * * *